UNITED STATES PATENT OFFICE.

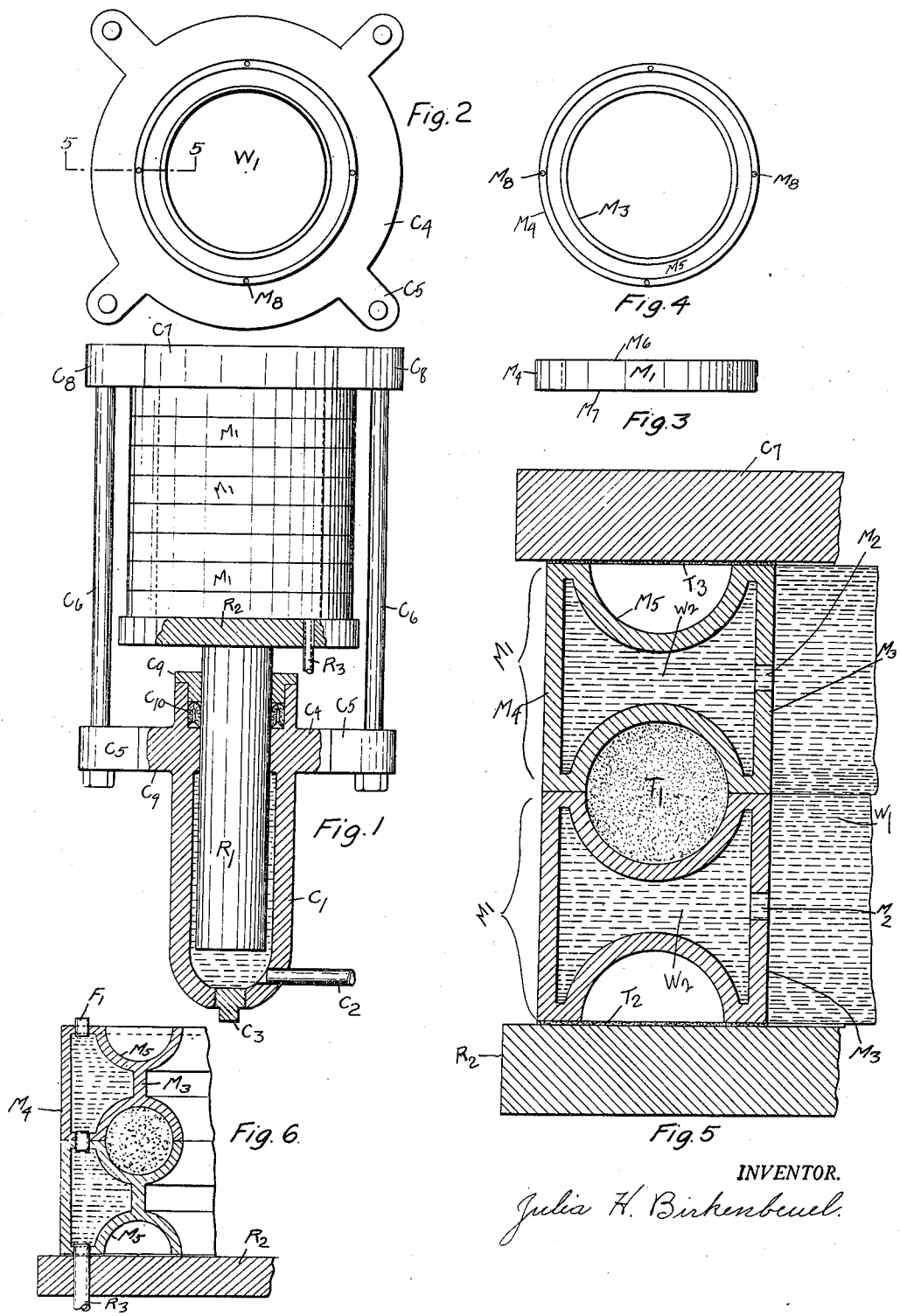

JULIA H. BIRKENBEUEL, OF PORTLAND, OREGON.

VULCANIZING-PRESS MOLD.

1,311,375.

Specification of Letters Patent. Patented July 29, 1919.

Application filed December 16, 1918. Serial No. 267,048.

*To all whom it may concern:*

Be it known that I, JULIA H. BIRKENBEUEL, a citizen of the United States, in the city of Portland, the county of Multnomah, and State of Oregon, have invented a new and useful Vulcanizing-Press Mold.

My invention relates more particularly to the art of vulcanizing rubber tires, but can be used to include any form of molded rubber goods.

The objects of my invention are primarily to simplify the construction of a vulcanizing apparatus to render it possible to concentrate the vulcanizing action as desired, to reduce the amount of labor entailed in loading and unloading the molds in and out of the press as well as making the operation less disagreeable.

To accomplish these results I have arranged the elements of my invention in the following manner.

Referring to the drawing, Figure 1 is an elevation of the complete device with hydraulic press shown in section; Fig. 2 is a plan of the device shown in Fig. 1 with cover plate of press removed; Fig. 3 is an elevation of one unit of mold; Fig. 4 is a plan of the mold shown in Fig. 3; Fig. 5 is an enlarged detail of section through 5—5 in Fig. 2; Fig. 6 is a detail showing a modified form of my device for vulcanizing the tread more than the rim portion of the tire.

Similar letters and numbers of reference refer to the same or similar parts throughout the several views.

$C^1$ is a hydraulic cylinder to which water is admitted by way of pipe $C^2$ which also serves as an exhaust pipe. The plug $C^3$ in the lower end of cylinder $C^1$ being the usual closure means employed at this point. At the upper end of cylinder $C^1$ is the flange $C^4$ from which project the lugs $C^5$ which receive the lower end of the rods $C^6$ which are used to unite the cylinder $C^1$ with the cover plate $C^7$. The rod $C^6$ being slightly shouldered to support its own weight and that of the cover plate $C^7$. The lugs $C^8$ on the cover plate $C^7$, receive the upper end of the rods $C^6$.

The mold ring $M^1$, is a hollow jacketed ring, having the ports $M^2$ in the walls $M^3$, connecting the hollow portion within the jacket, with the open central portion $W^1$, within the ring $M^1$, while the circular outside wall $M^4$ is intact. The curved portion $M^5$ in the top face $M^6$ and the bottom face $M^7$, of the mold ring $M^1$ is adapted to receive the object to be molded.

$R^1$ is the usual hydraulic ram, upon which is mounted the ram table $R^2$, which is equipped with the pipe $R^3$ which acts both as a supply and waste for the well $W^1$.

$F^1$, are ferrules for uniting the jacketed portion of the mold rings as well as alining the rings as shown in Fig. 6.

The operation of my device is as follows: The ram table $R^2$ is moved to its lower position by allowing water to escape from cylinder $C^1$ by way of pipe $C^2$. Packing $T^2$ is placed on the ram table $R^2$ and the mold ring $M^1$ is placed upon said packing $T^2$. The proper amount of material $T^1$ for a tire is placed in the trough $M^5$ which is thus presented. The second mold ring $M^1$ is now placed upon the first and its trough supplied with the material to be molded, and so on until the capacity of the press is reached, it being seen that a complete mold is formed every time a mold ring is added to the stack.

Between the top mold ring $M^1$ and the cover plate $C^7$ is placed the packing $T^3$. Pressure is then admitted to the cylinder $C^1$ and the ram table $R^2$ raises and presses the entire stack of mold rings $M^1$ and their contents $T^1$ against the cover plate $C^7$.

It will be noticed that the molds being placed one above the other with the tires forming gaskets between them form a pressure tight well $W^1$, the ends of which are sealed by the ram table $R^2$ and the pressure cover plate $C^7$. Steam or hot water is now admitted to the well $W^1$ by way of the pipe $R^3$ and the heating medium is allowed to fill the hollow portion of the mold rings $M^1$ by way of the openings $M^2$.

The vulcanizing process is now taking place and will continue to do so until the heat and the pressure are cut off from the device, the heat, of course, being cut off first and the pressure as soon as danger of the escaping steam or hot water is past. The mold rings $M^1$ will then descend and be exposed so as to be easily removable from the press without the opening of a single bolt or locking mechanism.

It will be appreciated by anyone familiar with the vulcanizing methods in common use that this is a decided forward step in the manufacture of tires and molded rubber goods. An equally important feature being the ability of the manufacturer to vulcanize in varying degrees according to the amount of exposure to the heat, which in the tire industry alone, is a boon, since it is most desirable to vulcanize to a greater degree on the tread than on the rim.

It will be seen in Fig. 6 that by modifying the shape of the mold rings so that heat will be supplied on the tread portion while the interior or rim portion can be subjected to temperature reducing mediums such as water or air, if desired, it will cause the greater degree of vulcanizing to take place on the tread where it is most needed.

The ferrules $F^1$ are tapered to insure a tight joint between the mold rings, which are used in this form of my device much in the manner of ferrules which are used to join radiator sections.

When articles other than tires are to be formed and vulcanized they are merely distributed around an inclosure and joined by a fin as are drop forgings for the purpose of forming a packing between the mold rings, which fins can be removed by a trimmer built into the molds, as is common in the art.

While I have thus described my invention it is not my intention to limit myself to this precise form or method of operation of my device, but intend that it shall cover all forms and modifications that fall fairly within the appended claims.

What I claim as new and desire to protect by Letters Patent of the United States, is:

1. An apparatus for vulcanizing rubber tires to varying degrees of hardness, consisting of a mold having a heating jacket formed around the portion to be vulcanized most and having the portion of the mold which forms the part which is to be vulcanized least, exposed to a cooling medium contained in a central well, a means for sealing said well, a means for compressing said rubber within the molds, a means for supplying heat to said jacket, and a means for supplying a cooling medium to said well.

2. In a vulcanizer, the combination of a hydraulic cylinder, a ram, a press cover plate, tie bolts, for holding said cover plate, hollow jacketed mold rings having a mold groove in each of their flat faces and openings in the inner wall, for admitting the heating agent from the central well to the hollow portion of said mold.

3. A mold means consisting of two or more hollow jacketed mold rings having mating grooves formed in each of their flat faces, a means for connecting the jacketed portions of the molds and alining their mated portions, which means is adapted to carry the heating agent and which consists of a ferrule, tapered at each end, a central well, formed within the mold rings, a means for sealing the top and bottom of said well, a means for supplying heat to the hollow jacketed portion of the molds, a means for supplying a cooling medium to the central well and a means for compressing the fabricated materials between the mold rings.

4. In a vulcanizer, the combination of a hydraulic press and a mold means, comprising two or more hollow jacketed mold rings, having mating grooves of the shape of the articles to be molded, formed in the flat surfaces of said rings, and the interior walls of said mold rings having ports to allow a circulation of the heating medium from the central well through the hollow jacket of the mold, means for sealing the top and bottom of the well formed by the stack of mold rings, consisting of a packing placed between the upper ring and the cover plate of the press and a second ring placed between the lower ring and the ram table of the press, and a means for alining the molds consisting of dowel pins in the flat faces of the mold rings.

JULIA H. BIRKENBEUEL.